United States Patent [19]

Meador et al.

[11] 4,107,597

[45] Aug. 15, 1978

[54] ELECTROMAGNETIC WAVE PROPAGATION WELL LOGGING UTILIZING MULTIPLE PHASE SHIFT MEASUREMENT

[75] Inventors: Richard A. Meador, Houston; Larry L. Adams, Stafford; Percy T. Cox; Larry W. Thompson, both of Houston; James A. Fuchs, Missouri City, all of Tex.

[73] Assignee: Texaco Inc., New York, N.Y.

[21] Appl. No.: 749,845

[22] Filed: Dec. 13, 1976

[51] Int. Cl.² .......................... G01V 3/18; G01V 3/12
[52] U.S. Cl. ......................................................... 324/6
[58] Field of Search ............................................ 324/6

[56] References Cited

U.S. PATENT DOCUMENTS

| 3,052,835 | 9/1962 | Dunlap et al. ........................ 324/6 X |
| 3,086,168 | 4/1963 | Buckner ................................... 324/6 |
| 3,551,797 | 12/1970 | Gouilloud et al. ...................... 324/6 |

FOREIGN PATENT DOCUMENTS

206,735  12/1971  U.S.S.R. ...................................... 324/6

OTHER PUBLICATIONS

Grubb et al., *Borehole measurements . . . in the 300 kHz to 25 MHz frequency range*, Radio Science, vol. 11, No. 4, pp. 275–283, Apr. 1976.

*Primary Examiner*—Gerard R. Strecker
*Attorney, Agent, or Firm*—Carl G. Ries; Thomas H. Whaley; William J. Beard

[57] ABSTRACT

The invention disclosed herein includes methods and apparatus for determining true formation resistivity, flushed zone resistivity and invasion diameter of the earth formation in the vicinity of a well borehole. A radio frequency electromagnetic field in the frequency range from 800 kilohertz to 4 megahertz is generated in a borehole and the electromagnetic field is detected at a plurality of longitudinally spaced locations. Measurements of the attenuation and propagation velocity of the electromagnetic wave at the longitudinally spaced receivers may then be interpreted according to predetermined relationships in terms of the formation resistivity, flushed zone resistivity and invasion diameter surrounding the borehole.

6 Claims, 6 Drawing Figures

ELECTROMAGNETIC WAVE PROPAGATION WELL LOGGING UTILIZING MULTIPLE PHASE SHIFT MEASUREMENT

BACKGROUND OF THE INVENTION

The present invention relates to methods and apparatus for determining the characteristics of material surrounding an open hole well bore and in particular, relates to methods and apparatus for radio frequency resistivity well logging in which the true formation resistivity, flushed zone resistivity and invasion diameter are uniquely determinable by means of in situ measurements taken in a well borehole.

It has been conventional practice to log the electrical characteristics of earth formations in the vicinity of a well borehole in order to determine location of oil-bearing strata. There are only three material parameters which affect an electromagnetic wave, whether the wave gets from one point to another by induction or by propagation. They are conductivity (resistivity), magnetic susceptibility and dielectric constant. Conductivity provides an indication of the energy absorbing characteristics of the medium, while magnetic susceptibility and dielectric constant give a measure of the energy storing capacity of a material. The magnetic susceptibility of most earth materials has relatively little effect on electromagnetic waves and is of very little use in electrical logging techniques. Dielectric constant has considerable variation in the earth and has a large influence on high-frequency propagation but very little influence at low frequencies. It is well known that conductivity or resistivity has wide variation in value for earth materials and strongly affects all electromagnetic waves.

A propagating electromagnetic wave has two fundamental characteristics, amplitude and phase. By comparing the amplitude and phase of an electromagnetic wave as it passes receivers, propagation characteristics due to the formation may be studied. Measurement of these two characteristics in terms of wave travel time and attenuation may be used to determine the dielectric constant and/or the resistivity of the media through which the wave is propagated.

Study has indicated that four general frequency ranges exist which allow measurement of the formation effects. These four frequency regions are induction, low radio frequency propagation, high radio frequency propagation, and ultra high radio frequency propagation. The relative influence of resistivity ($R_t$) and dielectric constant ($\epsilon_t$) in these four ranges is shown in the following table (where $R_t = 20\Omega m$ and $\epsilon_t = 20$):

RELATIVE INFLUENCE

| TYPE OF LOG | RESIS-TIVITY | DIELE-CTRIC | APPROX. WAVELENGTH IN EARTH FORMATION |
|---|---|---|---|
| Induction (20 to 50 kHz) | 1.0 | 0.0004 | 3.4 k Meter (11,000 ft.) |
| Low Radio Frequency Propagation Resistivity (2 MHz) | 1.0 | 0.004 | 34 meter (110 ft.) |
| High Radio Frequency Dielectric and Resistivity (30 MHz) | 1.0 | 0.7 | 2.2 meter (7.2 ft.) |
| Ultra-High Radio Frequency Dielectric | 1.0 | 22.0 | .061 meter |

RELATIVE INFLUENCE-continued

| TYPE OF LOG | RESIS-TIVITY | DIELE-CTRIC | APPROX. WAVELENGTH IN EARTH FORMATION |
|---|---|---|---|
| (1 to 3 GHz) | | | (0.2 ft.) |

From the table, it can be seen that resistivity is the only parameter that materially influences the measurements in the induction and low radio frequency propagation range. The resistivity and dielectric constant have about the same magnitude of influence in the high radio frequency propagation region. In the ultra high radio frequency region, the dielectric constant dominates the wave travel time while the resistivity influences wave attenuation.

Electrical induction logging has been practiced for many years. In conventional induction logging, a well logging sonde is provided having a transmitter coil (or array of coils) and a receiver coil (or array of coils) at longitudinally spaced intervals from the receiver coil. Usually, an alternating current, in a range of 20 to 50 kilohertz, is passed through the transmitter coil. The resulting electric fields produced by this alternating current in the earth formation surrounding a well bore are detected at a spaced receiver coil by sensing the induced current or voltage in the receiver coil. Induction logging has been principally used with oil-base drilling mud or drilling fluids having high resistivities but, in recent years, has come to be used even with a highly conductive (low resistivity) drilling fluids.

In low radio frequency wave propagation, as already pointed out, the dielectric constant has practically no effect on the propagating wave. Since both the travel time and attenuation are affected in this region essentially only by the formation resistivity, measurements of these propagation parameters in low radio frequency regions yields essentially only resistivity information.

Various problems have arisen in the interpretation of either induction logging or low radio frequency wave propagation logging methods where relatively non-conductive fresh water bearing formations are encountered. Such fresh water bearing sands or formations exhibit high resistivity much the same as those encountered in hydrocarbon bearing formations. However, since hydrocarbons have a characteristically low dielectric constant and fresh water has a relatively high dielectric constant, high radio frequency propagation logs have been found to be useful in such applications. In U.S. Pat. No. 3,893,021, which is assigned to the assignee of the present invention, a solution to this problem is described utilizing a radio frequency electromagnetic field in the frequency range of 20 to 40 megahertz. At these high radio frequencies, the dielectric properties of the media surrounding the well bore influence the electromagnetic field together with the conductivity or resistivity characteristics of a material. By providing apparatus to measure both phase shift (travel time) and amplitude change (attenuation) of the signal, both the dielectric and resistivity characteristics of the earth formation in the vicinity of the borehole may be determined.

In ultra-high radio frequency logging, above 300 megahertz, wave travel time is essentially dependent only on the dielectric constant. This region is characterized by very short wave lengths and very high wave attenuation. Because of these factors, the ultra-high radio frequency logging system requires very close source to receiver spacing and hence has a very shallow depth of investigation.

Commercial DC or very low frequency AC (such as 60 Hertz) electrical resistivity logs require direct contact with the surrounding well bore by contacting electrodes. This creates problems is providing a sonde which can be easily pulled through the well bore yet make the necessary contact with the well bore. For this reason, induction logging, which does not depend on such direct contact, is more desirable. However, as earlier mentioned commercial induction electrical logging systems now available are principally used with oil-based drilling muds or drilling fluids having high resistivity and are adversely affected by brine filled or highly conductive drilling fluid filled well bores. Furthermore, commercial induction electrical logs are generally not accurate in high resistivity formations and both electrical resistivity and electrical induction logging systems commercially available have relatively poor thin-bed response; i.e. they do not give accurate resistivity values for beds thinner than four feet. It would therefore be beneficial to provide a well logging system which could provide an accurate measurement of true formation resistivity; flushed zone resistivity and invasion diameter, whether used in well bores having highly resistive drilling fluids (such as oil-base drilling muds) or higher conductive drilling fluids, and regardless of whether the formations are highly resistive or of thin beds.

Accordingly, it is an object of the present invention to provide a well logging system which is capable of accurate measurement of true formation resistivity, flushed zone resistivity and invasion diameter by means of low radio frequency electromagnetic wave propagation.

Another object of the present invention is to provide an electric resistivity well logging system which is not adversely affected by brine or other highly conductive drilling fluid filled well bores.

Another object of the present invention is to provide an electric resistivity well logging system which is accurate for both low and high resistivity formations and formations having thin beds.

Another object of the present invention is to provide a resistivity well logging system which operates at frequencies allowing a measure of true formation and flushed zone resistivities without regard for most of the problems associated with commercial dual induction resistivity logs.

BRIEF DESCRIPTION OF THE INVENTION

The above and other objects, features and advantages are provided in the present invention by a well logging system comprising a low radio-frequency resistivity logging system. In the well logging system of the present invention, a downhole well logging sonde is provided which contains radio frequency measurement apparatus. The radio-frequency logging apparatus comprises a 2 megahertz transmitting apparatus together with four longitudinally spaced receiver coils. At the radio-frequency chosen for use in the present invention, the only physical characteristics of the earth formation surrounding the well bore which materially influences the alternating currents induced in the formations by the transmitting apparatus are conductivity (or resistivity) characteristics of the earth formation in the vicinity of the borehole. By measuring the radio-frequency phase shift between three separated pairs of the receiver coils, short-spaced, intermediate and long-spaced measurements of earth formation resistivity characteristics at relatively short, intermediate and long radii of investigation can be determined. Novel apparatus for performing the phase shift measurements at the radio-frequency is provided, together with means for interpreting the three measured phase shifts to derive true formation resistivity, flushed zone resistivity and invasion diameter of the earth formation in the vicinity of the borehole.

Novel concepts of the present invention are pointed out with particularity in the appended claims. The invention can be more fully appreciated and understood by reference to the following detailed description when taken in conjunction with the accompanying drawings in which:

DETAILED DESCRIPTION OF THE INVENTION

Figure 1:
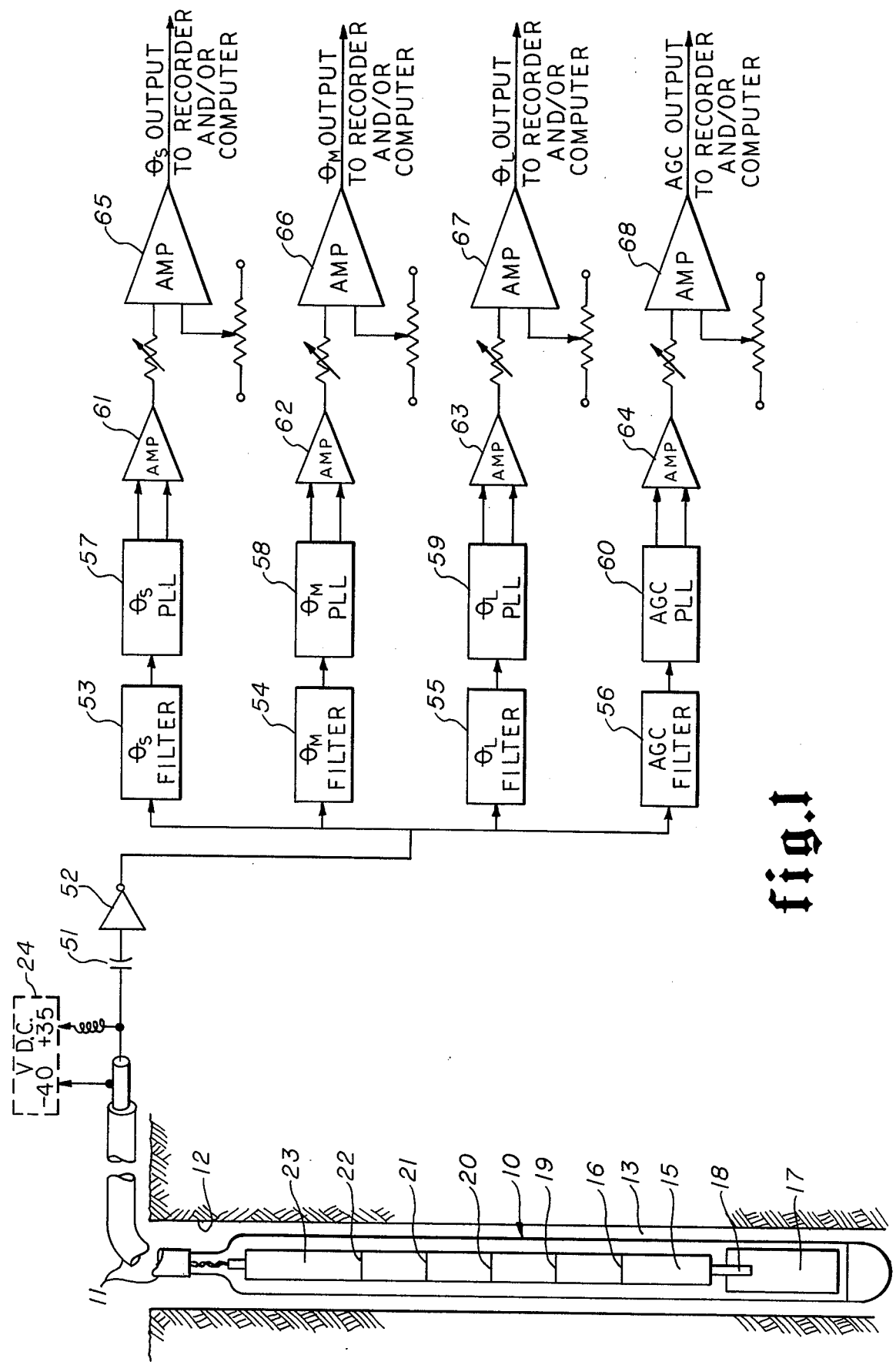
FIG. 1 is a block diagram illustrating the overall layout of a radio-frequency logging system in accordance with the present invention.

Referring now to FIG. 1, a low frequency resistivity well logging system in accordance with concepts of the present invention is illustrated schematically. The well logging sonde 10 is made up of a cylindrical coil mandrel and associated electronics which can be placed inside a pressure-tight case formed of a non-conducting material such as fiberglass. The sonde 10 is shown suspended by well logging cable 11 in an uncased well borehole 12. The borehole 12 is filled with a borehole or drilling fluid 13 and is surrounded by earth formations 14 whose conductivity properties are to be measured.

The lower portion of the well logging sonde 10 comprises an electronic transmitter section 15 to be more fully described hereafter, and associated transmitter coil 16 and battery pack 17. The transmitter section 15 is connected to the power of the battery pack 17 through a slip ring arrangement 18. The transmitter coil 16 is operated at a frequency of 2 megahertz and will be described subsequently in more detail.

Spaced at longitudinal intervals from the transmitter coil 16 are first, second, third and fourth receiver coils 19, 20, 21 and 22, respectively. These coils are spaced 10 inches, 22 inches, 34 inches and 46 inches, respectively from the transmitter coil 16. The receiver coils are used in pairs. Coils 19 and 20 are used for making a short-spaced measurement, coils 20 and 21 for making an intermediate spaced measurement and coils 21 and 22 for making a long-spaced measurement. It will be appreciated by those skilled in the art that while these transmitter and receiver coil spacings have been found useful in practicing the concepts of the present invention, they are intended as being illustrative only. It may be practical to utilize other than the disclosed spacing distances between the transmitter and receiver coils or a different number of receiver coils, such as six coils comprising the three separated pairs. Such variations are considered to be within the scope of the invention.

As will be appreciated, the radial depth of investigation of a coil pair of the logging system of the present invention is influenced by the spacing distance between the transmitting and receiving coils. The radial depth of investigation for the pairs of receiver coils increases from short spaced pair 19 and 20, to intermediate spaced pair 20 and 21, and to long spaced pair 21 and 22.

A conventional winch arrangement (not shown) may be used at the surface of the borehole 12 for moving the cable 11 and attached sonde through the borehole during a well logging operation. The winch arrangement may be provided with a conventional electrical or mechanical coupling linkage for recording well depth as a reference against which recorded signals from the downhole sonde 10 is recorded. Power for operation of the downhole receiver electronics section 23 is provided on the conductor of the well logging cable 11 by a surface power supply 24. Such power supplies may comprise conventional AC or DC supplies as known in the art.

Figure 2:
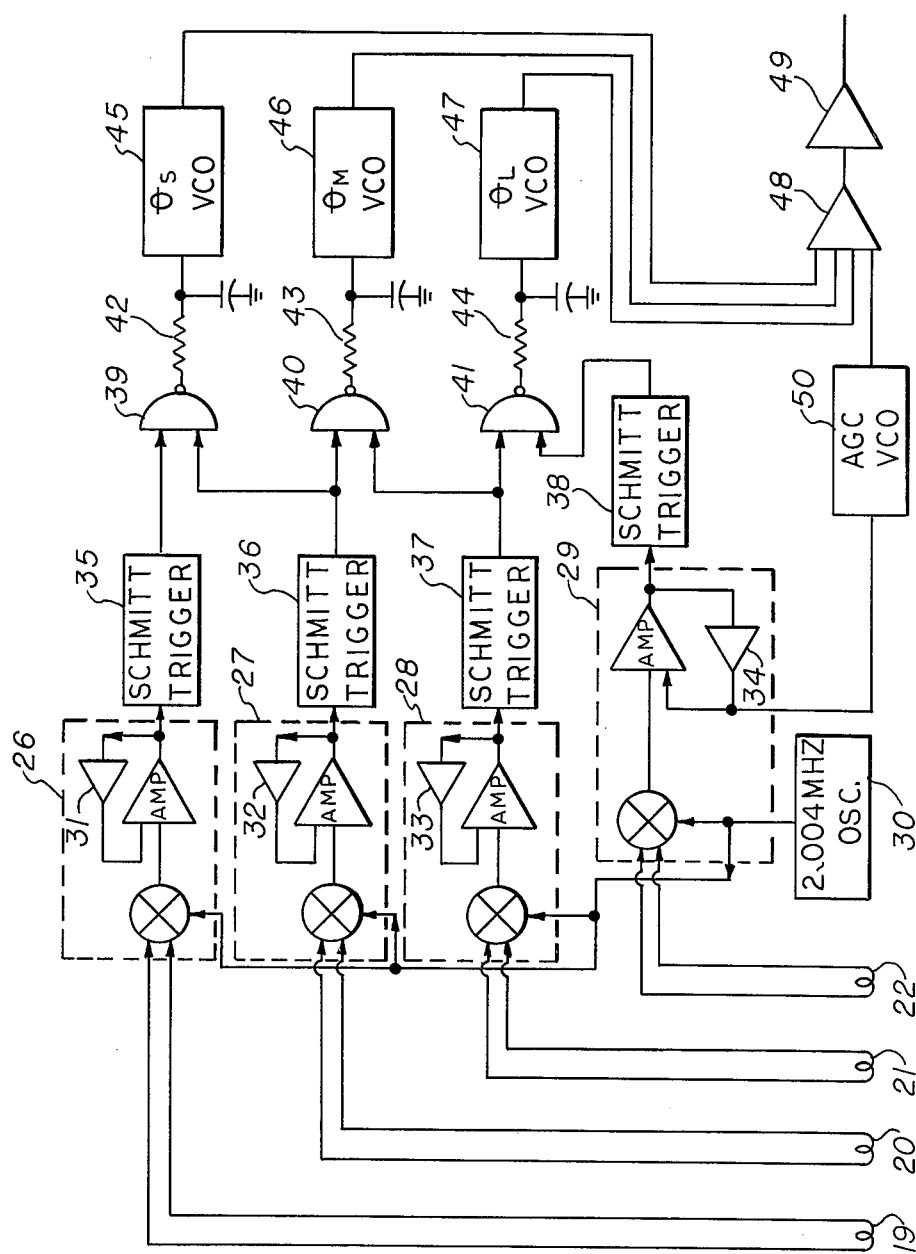
FIG. 2 is a schematic block diagram illustrating the downhole electronics portion of the system of FIG. 1.

Referring now to FIG. 2, the downhole electronic portion of the system is illustrated in the form of a block diagram. The battery pack 17, which is connectible to the transmitter electronics by a slip ring assembly 18 as illustrated in FIG. 1, may comprise rechargeable nickle cadmium batteries or the like. The slip ring method of connection allows the battery power to be easily turned on in the field and provides a means of inserting a fresh battery pack while the discharged batteries are being recharged. The transmitter electronics further comprises a crystal-controlled 2 megahertz, three-stage class C device 25 which uses standard RF circuits. The transmitter coil 16 may comprise fourteen turns of No. 12 enamel copper wire wound close spaced on the coil support mandrel.

The four receiver coils, 19, 20, 21 and 22 are identical single-turn electrostatically shielded coils. The electrostatic shielding reduces the chance of capacitive coupling with the transmitter, so that only propagating wave fields will be sensed by the coil pairs. As already mentioned, receiver coils 19 and 20 are used to make a short-spaced measurement, 20 and 21 to make an intermediate measurement and 21 and 22 to make a long-spaced measurement.

The signal from each receiver coil is fed to a single-conversion, 2 megahertz receiver 26, 27, 28 and 29 which amplifies and converts, by mixing, the signals to 4.0 kilohertz. One 2.004 megahertz crystal oscillator 30 is used for mixing in all four receivers 26, 27, 28 and 29. This allows all phase information present in the 2 megahertz propagated signals to be maintained in the 4.0 kilohertz converted signal.

In the receivers, each 4.0 kilohertz signal is fed to an automatic gain control amplifier 31, 32, 33, and 34, respectively, resulting in a constant output amplitude. The signals from the AGC amplifiers are then fed to Schmidt trigger circuits 35, 36, 37 and 38 which generate square waves which are precisely in phase with the received signals. These square waves are applied to exclusive-NOR logic gates 39, 40, and 41, which provide output pulses whose widths are proportional to the phase difference between the two inputs, gate 39 being for the short-spaced measurement, gate 40 for the intermediate spaced measurement and gate 41 for the long-spaced measurement. Thus, the square wave signals to the gates 39, 40 and 41, present a measurement of the phase difference or wave propagation velocity, between coils 19 and 20, 20 and 21, and 21 and 22, respectively.

The output of each of the three exclusive-NOR gates 39, 40 and 41 is integrated by single resistance capacitance filters 42, 43, and 44, respectively, to provide a DC voltage. The three DC voltages are then applied to respective voltage control oscillators 45, 46 and 47, each having a different center frequency. This action converts the respective DC signals to a VCO frequency. As each DC voltage varies, the voltage controlled oscillator (VCO) frequency varies. The three VCO outputs are passed through a summing amplifier 48 and cable driver 49 which sends the composite signal along the logging cable 11 to the surface electronics to be more fully described hereinafter with further reference to FIG. 1.

Since the measurement of phase difference is dependent on the amplitude of the signals going from the AGC amplifiers 31, 32, 33 and 34 to their respective Schmidt triggers 35, 36, 37 and 38, it is important to know when the AGC amplifiers are no longer keeping the signal amplitude constant. The AGC voltage of the longest spaced receiver 29 (since this receiver coil will have the weakest signal) gives a measure of this important information. The AGC voltage is applied to a fourth voltage controlled oscillator (VCO) 50 and summed along with the three phase signals.

Referring again to FIG. 1, at the surface, the composite signal is taken from the logging cable 11 by coupling capacitor 51 and supplied to an input buffer amplifier 52. The output from the buffer amplifier 52 is separated by band pass filter circuits 53, 54, 55 and 56 into the four original frequency modulated signals. Each signal is then applied to phase locked loop demodulators 57, 58, 59 and 60. The demodulators 57, 58, 59 and 60 lock onto the input signal tracking its frequency changes and providing a DC output voltage proportional to the input signal frequency.

Output signals from the phase locked loop demodulators 57–60 are supplied to differential amplifiers 61, 62, 63 and 64 for further amplification prior to input to conventional well logging recorders (not shown). Recorder amplifiers 65, 66, 67 and 68 further amplify the signals and use them to control the motion of strip chart recorder pins or the grids of cathode ray tubes if this type of recorder is used.

Figure 4:
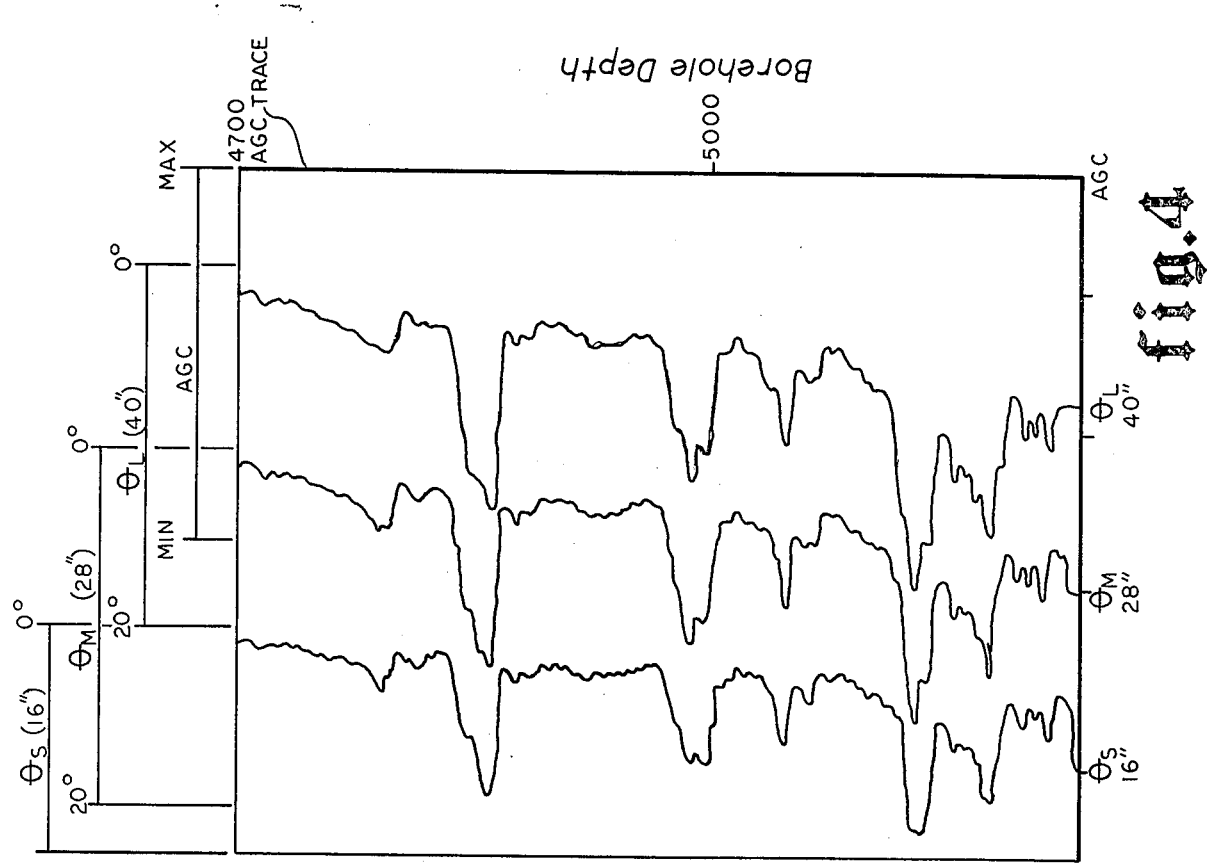
FIG. 4 is the plot of an actual well log obtained by a radio frequency logging system in accordance with the present invention, indicating phase difference for short, medium and long spaced measurements plotted against borehole depth.

Referring now to FIG. 4, a strip chart recorder display for four traces; $\theta_s$ (phase shift for short spaced measurement); $\theta_m$ (phase shift for intermediate spaced measurement); $\theta_1$ (phase shift for long spaced measurement); and AGC (AGC voltage from voltage controlled oscillator 50) is shown. The three phase traces $\theta_s$, $\theta_m$, and $\theta_1$ may be set up for 5°/inch sensitivity. These three phase traces may be used along with theoretical computer derived relationships to obtain $R_t$, $R_{xo}$ and $d_i$ by the solving of three simultaneous non-linear equations which relate these quantities. Although these values are preferably solved by a computer program, their solution will be illustrated in FIGS. 5 and 6 which will be described hereafter.

As already mentioned, since the measurement of phase differences is dependent on the amplitude of the signals going from AGC amplifiers 31, 32 and 33, to their respective Schmidt triggers 35, 36 and 37, it is important to know when the AGC amplifiers are no longer keeping the signal amplitude constant. The AGC trace, such as shown in FIG. 4, is for this important indication. If the signal amplitude is being maintained constant, the trace will appear as a straight line as shown in FIG. 4. However, in regions where the signal is not sufficient to make a measurement, the AGC trace will depart from a straight line to so indicate.

Figure 3:
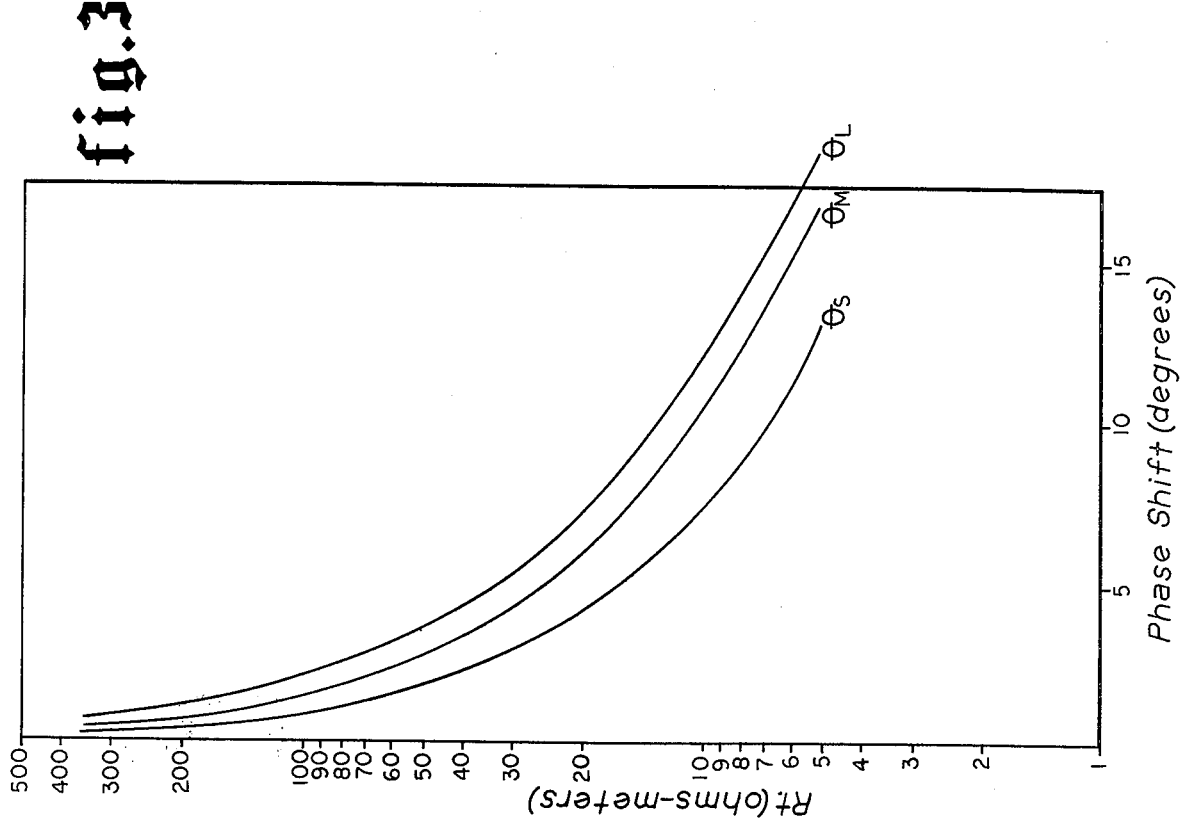
FIG. 3 is a theoretically derived plot of the phase difference for relatively short, medium and long phase shift measurements of the apparatus of FIG. 1 plotted against earth formation resistivity.

FIG. 3 is shown merely to illustrate the relationship or phase shift to true formation resistivity for short, intermediate and long radii measurements into the earth surrounding a borehole. The theoretically derived plot of FIG. 3 is for a 2 megahertz electromagnetic field, assuming no invasion of drilling fluids.

Figure 6:
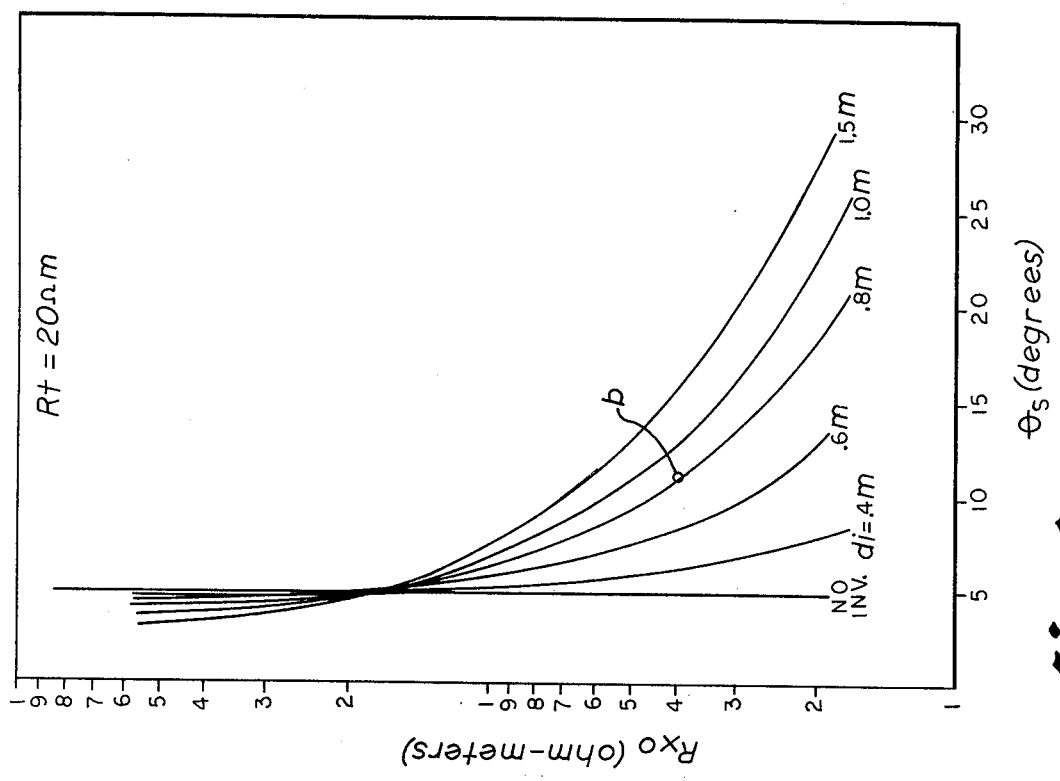
FIG. 6 is a plot of invaded zone resistivity, for true formation resistivity derived from FIG. 5, against short spaced phase difference measurement.
Figure 5:
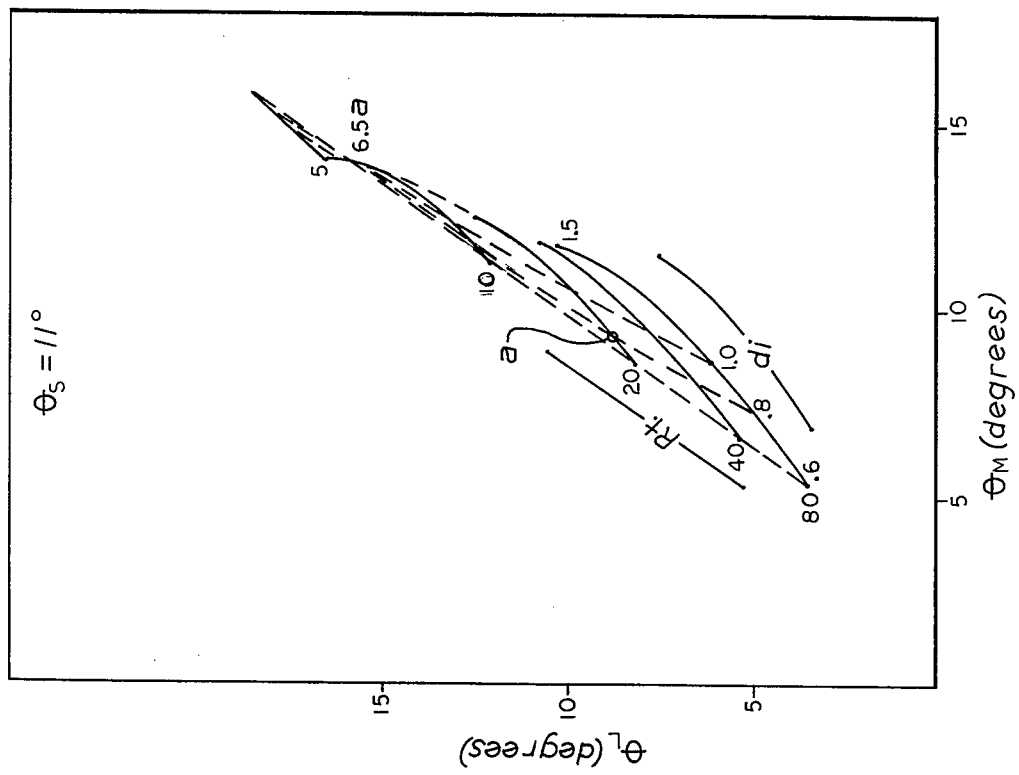
FIG. 5 is a plot of true formation resistivity and invasion zone diameter for particular phase differences for short, medium and long spaced measurements.

Referring now to FIGS. 5 and 6, solution of the three simultaneous non-linear equations necessary for determination of $R_t$, $R_{xo}$ and $d_i$ will be illustrated. For purposes of illustration, it will be assumed that $\theta_s$ equals 11° for which two families of curves for $R_t$ and $d_i$ can be plotted against variable $\theta_m$ and $\theta_1$. In FIG. 5, curves for $R_t$ are shown as dashed lines while the curves for $d_i$ are shown as solid lines. Merely for purposes of illustration, it will be assumed that from the recording chart, when $\theta_s$ equals 11°, $\theta_m$ and $\theta_1$ will be 9.3° and 8.7°, respectively. By entering the chart of FIG. 5, these readings intersect at point $a$. At this point, $R_t$ equals 20Ωm and $d_i$ equals 0.8M. Thus, true resistivity $R_t$ is determined to be 20Ωm and $d_i$ is determined to be 0.8 meters. These figures may now be used in the chart of FIG. 6 to determine the resistivity of the flushed zone, $R_{xo}$.

Assuming true resistivity to be a constant figure ($R_t$ equals 20Ωm in the present case) a family of curves can be drawn for invaded zone resistivity $R_{xo}$ for variable short-spaced phase shift $\theta_s$ and invaded zone diameters $d_i$. Now using the short-spaced phase shift 11° and the invaded zone diameter $d_i$ = 0.8 meters, determined from FIG. 5, point $b$ is read on the chart of FIG. 6. From this, it can be determined that $R_{xo}$ = 3.95 meters. Thus, for the phase shift measurements $\theta_s$ = 11°, $\theta_m$ = 9.3°, $\theta_1$ = 8.7°, the following determinations are made for true resistivity, invaded zone diameter and invaded zone resistivity: $R_t$ = 20, $d_i$ = 0.8, $R_{xo}$ = 3.95. As already mentioned, these graphical solutions are merely for purposes of illustration. In practice, graphical solutions could be generated on a computer program and the simultaneous solutions made by computer. A small general purpose computer such as the Model PDP-11 of the Digital Equipment Corp. can be properly programmed in a computer language such as FORTRAN for this purpose when provided with the graphical relationships of FIGS. 5 and 6.

To summarize the operation of the well logging system of the present invention, a downhole transmitter 15 is used to excite the earth formation in the vicinity of the well bore with 2.0 megahertz radio frequency energy. Four spaced receiver coils 19–22, receive voltages induced therein by the 2 megahertz signal. These receivers acting in pairs; 19 and 20, 20 and 21 and 21 and 22, measure respectively, the relative phase shift for short, medium and long-spaced radial distances from the borehole. These measurements are transmitted to the surface as multiplexed frequency modulated data. At the surface, the signals are demodulated and supplied to a data recorder (not shown) providing a trace or continuous log of phase shift as a function of borehole depth similar to the one shown in FIG. 4. This information may be then be utilized in a computer program to determine $R_t$, $d_i$ and $R_{xo}$.

The $R_t$, $d_i$ and $R_{xo}$ so determined can be used to interpret earth formations surrounding the borehole being logged. The information can also be combined with other information determined by other logging methods, for example, those which require determination of the dielectric constant to distinguish fresh water zones from oil zones.

From the foregoing disclosure, those skilled in the art may make other alternative arrangements of the apparatus and method of the present invention without departing from the intended scope thereof. Therefore, it is intended that the scope of the invention be limited only by the claims which follow.

We claim:

1. A system for determining true formation resistivity ($R_t$), flushed zone resistivity ($R_{xo}$) and invasion diameter ($d_i$) of earth materials in the vicinity of a well borehole, comprising:
   means for generating, in said well borehole, an alternating electromagnetic field at a first radio frequency in the range of approximately 2 megahertz to 4 megahertz;
   means for detecting, in said well borehole, phase differences of the total electromagnetic field generated by said field generating means at relatively short, intermediate and long radial depths into the earth material surrounding said borehole and detecting means including pairs of receiver coils at longitudinally short, intermediate, and long spaced distances from said field generating means;
   means, connected to said detection means, and comprising receiver and amplifier means for receiving signals from each of said coils of said pairs of coils and converting said signals to signals of a second frequency having constant output amplitudes, for generating signals representative of said phase differences at said short, intermediate and long radial depths, respectively;
   means, connected to said signal generating means for transmitting said short, intermediate and long phase difference signals to the earth's surface; and
   means responsive to said short, intermediate and long phase difference signals for computing $R_t$, $R_{xo}$ and $d_i$ of said earth materials in the vicinity of said well borehole.

2. The system of claim 1 wherein said receiver and amplifier means comprises a receiver for each one of said receiver coils, each of said receivers being commonly connected to a crystal controlled oscillator operating at a third frequency equal to said first frequency plus said second frequency.

3. The system of claim 1 wherein said signal generating means comprises means for converting said signals of constant output amplitude to first, second and third output pulses whose widths are proportional to the phase differences between first and second coils of said short, intermediate and long spaced pairs of coils, respectively.

4. The system of claim 3 wherein said signal generating means comprises means for detecting deviations in amplitude of said second frequency by providing a deviation signal.

5. The system of claim 4 wherein said signal generating means comprises means for integrating and summing signals from said first, second, and third output pulses and said deviation signal into a composite signal for transmission to the earth's surface by said transmitting means.

6. The system of claim 5 including, at the earth's surface, filter means for filtering from said composite signal each of said first, second and third pulse signals for transmission to said computing means.

* * * * *